United States Patent [19]

Lutz

[11] Patent Number: 4,814,378

[45] Date of Patent: Mar. 21, 1989

[54] POLYMER BLEND OF CARBON MONOXIDE/OLEFIN COPOLYMER AND A VINYL AROMATIC COMPOUND WITH AN $\alpha,\beta$-UNSATURATED CYCLIC ANHYDRIDE COPOLYMER

[75] Inventor: Robert G. Lutz, Santa Rosa, Calif.

[73] Assignee: Shell Oil Company, Houston, Tex.

[21] Appl. No.: 208,618

[22] Filed: Jun. 20, 1988

[51] Int. Cl.$^4$ ............................................. C08F 8/00
[52] U.S. Cl. ..................................... 525/55; 525/153; 525/539; 525/130; 525/189; 528/392
[58] Field of Search ................. 525/55, 153, 539, 130, 525/189; 528/392

[56] References Cited

U.S. PATENT DOCUMENTS 4,642,326  2/1987  Yasumura et al. ................. 525/153

Primary Examiner—Harold D. Anderson
Assistant Examiner—T. Mason

[57] ABSTRACT

Polymer blends having a major proportion of a linear alternating copolymer of carbon monoxide and at least one ethylenically unsaturated hydrocarbon and a minor proportion of a copolymer of a vinyl aromatic compound and an alpha,beta-unsaturated cyclic anhydride are provided which demonstrated improved processability and melt stability.

8 Claims, No Drawings

POLYMER BLEND OF CARBON MONOXIDE/OLEFIN COPOLYMER AND A VINYL AROMATIC COMPOUND WITH AN α,β-UNSATURATED CYCLIC ANHYDRIDE COPOLYMER

FIELD OF THE INVENTION

This invention relates to an improved polymer blend comprising predominantly a linear alternating polymer of carbon monoxide and at least one ethylenically unsaturated hydrocarbon. More particularly the invention relates to blends of the linear alternating polymer with a copolymer of a vinyl aromatic compound and an alpha,beta-unsaturated cyclic anhydride.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium salts as catalyst. Nozaki extended this process to produce linear alternating polymers in the presence of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon has become of greater interest in part because of the greater availability of the polymers in quantity. These polymers, often referred to as polyketones or polyketone polymers, have been shown to be of the repeating formula —CO—(A)— wherein A is the moiety of unsaturated hydrocarbon polymerized through the ethylenic unsaturation. By way of further illustration, when the unsaturated hydrocarbon is ethylene the polymer is represented by the repeating formula —CO—(CH$_2$—CH$_2$)—. The general process for the more recent production of such polyketone polymers is illustrated by a number of Published European Patent Applications including Nos. 121,965 and 181,014. The process typically involves a catalyst composition formed from a compound of the Group VIII metals palladium, cobalt or nickel, the anion of a strong non-hydrohalogenic acid and a bidentate ligand of phosphorus, arsenic or antimony.

The resulting polymers are relatively high molecular weight thermoplastics having established utility in the production by conventional methods such as extrusion and injection molding of shaped articles such as containers for food and drink and internal and external parts for automotive applications. For some particular applications it has been found desirable to have properties of a polymeric composition which are somewhat different from those of the polyketone polymer. It would be of advantage to retain the more desirable properties of the polyketone polymer and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon and certain other polymeric material. More particularly, according to the invention, there are provided blends of the linear alternating polyer and a copolymer of a vinyl aromatic compound and an alpha,beta-unsaturated cyclic anhydride compound. The blends are characterized by improved processability and melt stability as compared with the linear alternating polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic including ethylene and other alpha-olefins such as propylene, butylene, isobutylene, 1-hexene, 1-octene and 1-dodecene, or are arylaliphatic having an aryl substituent on an otherwise aliphatic molecule, particularly an aromatic substituent on a carbon atom of the ethylenic unsaturation. Illustrative of this latter class of ethylenically unsaturated hydrocarbons are styrene, p-methylstyrene, m-propylstyrene, and p-ethylstyrene. Preferred polyketone polymers are copolyers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer and the polymer will contain substantially one molecule of carbon monoxide for each molecule of unsaturated hydrocarbon. When terpolymers of carbon monoxide, ethylene and a second hydrocarbon are employed as a blend component there will be within the terpolymer at least about 2 units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain is therefore represented by the repeating formula

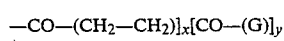
$$-CO-(CH_2-CH_2)]_x[CO-(G)]_y$$

wherein G is the moiety of the second hydrocarbon polymerized through the ethylenic unsaturation. The —CO—(CH$_2$—CH$_2$)— units and the —CO—(G)— units are found randomly throughout the polymer chain and the ratio of y:x is no more than about 0.5. In the modification of the invention where a copolymer of carbon monoxide and ethylene is employed as a blend component, there will be no second hydrocarbon present and the polymer will be represented by the above formula wherein y is 0. When y is other than 0, i.e., terpolymers are employed, ratios of y:x from about 0.01 to about 0.1 are preferred. The end groups or "caps" of the polymer chain will depend upon the particular materials present during the production of the polyketone polymer and whether and how the polymer was purified. The precise properties of the polymers will not depend upon the particular end groups to any considerable extent, however, so that the polymer is fairly represented by the above formula for the polymer chain. Of particular interest are the polyketone polymers of number average molecular weight from about 1000 to about 200,000, particularly those polymers of number average molecular weight from about 20,000 to about 90,000 as determined by gel permeation chromatography. The physical properties of the polymers will depend in part upon the molecular weight, whether the polymer is a copolymer or a terpolymer and, in the case of terpolymers, the proportion of the second hydrocarbon present. Typical melting points of the polyketone polymers are from about 175° C. to about 300° C., more frequently from about 210° C. to about 270° C.. The polymers have limiting viscosity numbers (LVN), when measured in a standard capillary viscosity measuring device in m-cresol at 60° C., of from about 0.5 to about 10, preferably from about 0.8 to about 4.

A method of producing the polyketone polymers which is now becoming convention is to contact the carbon monoxide and unsaturated hydrocarbon(s) in the presence of a catalyst composition formed from a palladium salt, the anion of a non-hydrohalogenic acid having a pKa below about 6 and a bidentate ligand of phosphorus. The scope of the process for polyketone production is extensive but, without wishing to be limited, a preferred palladium salt isa palladium carboxylate, particularly palladium acetate, a preferred anion is the anion of p-toluenesulfonic acid or trifluoroacetic acid and a preferred bidentate phosphorus ligand is 1,3-bis(diphenylphosphino)propane or 1,3-bis[di(2-methoxyphenyl)phosphino]propane. Such a process for the production of polyketone polymers is illustrated by copending U.S. patent application Ser. No. 930,468, filed Nov. 14, 1986.

Polymerization is conducted in a gas phase in the substantial absence of reaction diluent or in a liquid phase in the presence of a reaction diluent such as an alkanol, e.g., methanol or ethanol. The reactants are contacted under polymerization conditions in the presence of the catalyst composition by conventional methods such as shaking or stirring in a reaction vessel. Suitable reaction temperatures are from about 20° C. to about 150° C. with preferred reaction temperatures being from about 50° C. to about 135° C.. Typical reaction pressures are from about 1 bar to about 200 bar, more typically from about 10 bar to about 100 bar. Subsequent to reaction the polymer product is recovered as by filtration or decantation. The polymer product may contain residues of the catalyst composition which are removed, if desired, by treatment of the polymer product with a solvent or extraction agent which is selective for the residues.

The minor component of the blends of the invention is a copolymer of a vinyl aromatic compound and an alpha,beta-unsaturated cyclic anhydride, which copolymer is optionally employed in combination with a homopolymer of the vinyl aromatic compound. A variety of vinyl aromatic compounds are usefully employed in the vinyl aromatic/cyclic anhydride copolymer, but preferred vinyl aromatic compounds are hydrocarbon or halohydrocarbon of up to 20 carbon atoms inclusive having a single vinyl substituent, i.e., a —CH=CH$_2$ group, attached to a benzene ring. Illustrative vinyl aromatic compounds are styrene, methylstyrene, chlorostyrene and t-butylstyrene. Copolymers wherein the vinyl aromatic compound is styrene are preferred. The alpha,beta-unsaturated cyclic anhydrides have up to 8 carbon atoms inclusive, from 5 to 6 atoms in the anhydride ring and have a carbon-carbon double bond in conjugation with at least one carbonyl group of the anhydride, which unsaturation is within the cyclic anhydride ring or alternatively is external to the ring. Suitable unsaturated cyclic anhydrides include maleic anhydride, citaconic anhydride and itaconic anhydride. Copolymers which employ maleic anhydride as the unsaturated cyclic anhydride are preferred.

Such vinyl aromatic compound/unsaturated cyclic anhydride copolymers are known in the art as are the methods for their production. The preferred copolymer is a random copolymer of the vinyl aromatic compound and the unsaturated cyclic anhydride although alternating or block copolymers are also satisfactory and the copolymer is also employed as a mixture with up to 70% by weight, based on total mixture, of homopolymerized vinyl aromatic compound. The use of vinyl aromatic/cyclic anhydride random copolymer without the substantial presence of homopolymer of vinyl aromatic compound is preferred.

In one modification, copolymer is produced by continuously adding a mixture of the vinyl aromatic compound and the unsaturated cyclic anhydride to about 5% to 50% by weight, based on non-polymeric materials present, or an aliphatic, cycloaliphatic or aromatic hydrocarbon reaction diluent of up to 8 carbon atoms, employed with certain ethers such as dimethyl ether or dioxane or with certain ketones such as acetophenone or methyl ethyl ketone. Agitation is provided to the reaction mixture which is maintained at a temperature from about 75° C. to about 200° C. under a pressure of up to 1000 psig. Portions of the product mixture are withdrawn and devolitized, as with an extruder, to yield the polymer product. The resulting vinyl aromatic/cyclic anhydride random copolymer is a solid thermoplastic copolymer having at least about 50% by weight, based on total copolymer, of polymerized vinyl aromatic compound moieties and less than about 50% by weight on the same basis of polymerized unsaturated cyclic anhydride moieties. Preferably the copolymer is from about 60% to about 99% of polymerized vinyl aromatic compound moieties with the remainder being polymerized unsaturated cyclic anhydride moieties.

In an alternate but less preferred modification, the vinyl aromatic/cyclic anhydride copolymer is provided as a mixture with vinyl aromatic compound homopolymer. The vinyl aromatic compound is heated with stirring in the presence of a peroxide polymerization initiator to initiate polymerization of the vinyl aromatic compound. Polymerization is conducted at an elevated temperature in the absence of reaction diluent or in the presence of a hydrocarbon or chlorohydrocarbon diluent such as toluene, xylene, chlorobenzene or carbon tetrachloride. The unsaturated cyclic anhydride is then added to the polymerization mixture but at a rate lower than the rate of vinyl aromatic compound polymerization. The resulting product mixture is from about 55% to about 70% by weight, based on total product mixture, of polymerized vinyl aromatic compound homopolymer and thus about 30% to about 45% of vinyl aromatic compound/cyclic anhydride random copolymer which is from about 60% to about 99% by weight, based on copolymer, of polymerized vinyl aromatic compound moieties and from about 1% to about 40% polymerized cyclic anhydride moieties.

Procedures for the production of vinyl aromatic compound/alpha, beta-unsaturated cyclic anhydride copolymers, as well as descriptions of the copolymers, are found in more detail in Zimmerman, U.S. Pat. No. 3,336,276, and U.S. Pat. No. 3,401,153, Baer, U.S. Pat. No. 2,271,934 and Cutter et al, U.S. Pat. No. 4,145,375, incorporated herein by reference. Certain of these copolymers are commercial and are marketed by ARCO under the tradename Dylark.

The blends of the invention comprise a mixture of a major proportion of the polyketone polymer and a minor proportion of the vinyl aromatic/cyclic anhydride copolymer. The precise percentage of the vinyl aromatic/cyclic anhydride copolymer to be employed in the blends is not critical and amounts of vinyl aromatic/cyclic anhydride copolymer from about 0.5% by weight to about 45% by weight, based on total blend, are satisfactory. Amounts from about 1% by weight to about 20% by weight on the same basis are preferred.

The method of producing the blend of the polyketone polymer and the vinyl aromatic/cyclic anydride copolymer is not material so long as a relatively uniform distribution of the vinyl aromatic/cyclic anhydride copolymer throughout the polyketone polymer is obtained. The blend of polyketone polymer and vinyl aromatic/cyclic anhydride copolyer is a non-miscible blend with the vinyl aromatic/cyclic anhydride copolymer existing as a discrete phase in the polyketone matrix having a phase size on the order of from about 0.7 micron to about 1.3 micron, more typically on the order of about 1 micron. The blend will not, therefore, be homogeneous but good properties are obtained when the distribution of the vinyl aromatic/cyclic anhydride copolymer throughout the polyketone polymer matrix is substantially uniform. The method of blending the polymer materials is that which is conventional for blending non-miscible polymeric materials. In one modification, the polymeric components in particulate form are mixed and passed through an extruder to produce the blend as an extrudate. In an alternate modification, the components are blended in a mixing device which exhibits high shear.

The blends of the invention may also include conventional additives such as antioxidants, stabilizers, fillers, fire retardant materials, mold release agents and other substances which are added to improve the processability of the polyers or to modify the properties of the resulting blend. Such additives are added by conventional methods prior to, together with or subsequent to the blending of the polymeric components.

The blends of the invention are characterized by improved processability and melt stability when compared to the polyketone polymer. The blends are of particular utility in applications where processes involving molten polymer are employed or where shaped or molded articles are desired which are likely to be exposed to elevated temperatures. The blends are processed by the usual conventional techniques such as extrusion or injection molding into films, sheets, plates or shaped articles which find application in the packaging industry, in the preparation of containers as for food and drink and in the preparation of internal as well as external parts for the automotive industry.

The invention is further illustrated by the following Illustrative Embodiments which should not be construed as limiting the invention.

ILLUSTRATIVE EMBODIMENT I

A linear alternating terpolymer of carbon monoxide, ethylene and propylene was prepared in the presence of a catalyst composition formed from palladium acetate, the anion of trifluoroacetic acid and 1,3-bis(diphenylphosphino)propane. The melting point of the polymer was 225° C. and the polymer had an LVN of 1.72 when measured in m-cresol at 60° C.

ILLUSTRATIVE EMBODIMENTS II

A blend of the terpolymer of Illustrative Embodiment I and 9.0% by weight based on total blend of a styrene/maleic anhydride copolymer was produced. The styrene/maleic anhydride copolymer used was Dylark 332, having a melt temperature of 425° C., obtained from ARCO. The polyketone polymer, the styrene/maleic anhydride copolymer and approximately 0.2% by weight, based on total polymer, of Irganox 1076, a conventional hindered phenolic antioxidant to provide background stabilization, were processed through a 15mm twin-screw Baker Perkins extruder. A sample of the polyketone polymer, containing 0.2% by weight Irganox 1076, was also extruded as a control. The extruder temperature was 240° C. operating with undried feed and under a nitrogen blanket. The extruder was operated at maximum RPM to obtain a residence time of 0.5 minute and the extruder strands were passed directly into water. The feed rate of the blend through the extruder was significantly improved over the feed rate of the control. The resulting polymeric blend was non-miscible as evidenced by examination of cold-cut samples, stained with ruthenium tetroxide, under an electron microscope. The styrene/maleic anhydride copolymer was present as a discrete phase having a particle size approximately 1 micron in diameter.

ILLUSTRATIVE EMBODIMENT III

The melt stability of the blend prepared in Illustrative Embodiment II as well as the polyketone polymer control from which it was produced was determined by comparing the heats of melting and crystallization of the polyketone in the blend with that of the polyketone control after exposure to elevated temperature. Measurements were made in a Perkin-Elmer DSC-7 differential scanning calorimeter (DSC) which employed samples of the blend or polyketone control in sealed pan containers. The pan and contents are heated at a controlled rate, typically 20° C./minute, until the sample has melted. The pan and contents are then cooled until the sample has solidified and then heated past a second melting point to 285° C. at which temperature the sample is maintained for 10 minutes. The pan and contents are then cooled until the sample has solidified a second time. The melting and crystallization temperatures are defined as the temperatures at which the heat flow reaches a maximum (for melting) or a minimum (for crystallization).

It is also possible to determine through the use of the DSC the magnitude of the first and second heats of melting ($H_1$ and $H_2$) and the first and second heats of crystallization ($C_1$ and $C_2$) for the polyketone control and also for the polyketone in the blend.

Typically the values for the heating of melting and crystallization will decrease upon repeated melting/solidification cycles as the apparent crystallinity of the sample decreases. The higher the heats of melting and crystallization the higher the degree of retained crystallinity and the greater the melt stability of the polymer or blend undergoing the test. The values from the DSC measurements are shown in Table I for the polyketone in the blend and the polyketone control. The values for the blend are corrected for the amount of styrene/maleic anhydride copolymer present in the blend. Heats are given in cal/g.

TABLE I

| Sample | $H_1$ | $C_1$ | $H_2$ | $C_2$ |
| --- | --- | --- | --- | --- |
| Control | 22.3 | 17.2 | 18.5 | 13.4 |
| 9.0% by wt. blend | 22.5 | 20.4 | 20.8 | 15.0 |

What is claimed is:

1. A composition comprising a non-miscible blend of, as a major component, a linear alternating polymer of carbon monoxide and at least one ethylenically unsaturated hydrocarbon and, as a minor component, a copolymer of a vinyl aromatic compound and an alpha,-beta-unsaturated cyclic anhydride.

2. The composition of claim 1 wherein the linear alternating polymer is represented by the repeating formula $$-CO-(CH_2-CH_2)]_x CO-(G)]_y$$

wherein G is the moiety of an ethylenically unsaturated hydrocarbon of at least 3 carbon atoms polymerized through the ethylenic unsaturation and the ratio of y:x is no more than about 0.5.

3. The composition of claim 2 wherein the minor component is a copolymer of at least 50% by weight based on total copolymer of polymerized vinyl aromatic compound moieties and less than 50% by weight of polymerized unsaturated cyclic anhydride moieties.

4. The composition of claim 3 wherein the copolymer is provided as a mixture with from about 55% by weight to about 70% by weight, based on total mixture, of vinyl aromatic compound homopolymer.

5. The composition of claim 3 wherein the cyclic anhydride is maleic anhydride.

6. The composition of claim 5 wherein y is 0.

7. The composition of claim 5 wherein G is a moiety of propylene and the ratio of y:x is from about 0.01 to about 0.1.

8. The composition of claim 7 wherein the vinyl aromatic compound is styrene.

* * * * *